United States Patent [19]

Belde et al.

[11] Patent Number: 4,474,681

[45] Date of Patent: Oct. 2, 1984

[54] PRODUCTION OF AQUEOUS SUSPENSIONS OF FINELY DIVIDED TITANIUM DIOXIDE

[75] Inventors: Horst Belde, Ludwigshafen; Hans Langenfelder, Mannheim; Werner Hoerauf, Ludwigshafen, all of Fed. Rep. of Germany

[73] Assignee: BASF Aktiengesellschaft, Fed. Rep. of Germany

[21] Appl. No.: 394,798

[22] Filed: Jul. 2, 1982

[30] Foreign Application Priority Data

Jul. 18, 1981 [DE] Fed. Rep. of Germany ....... 3128477

[51] Int. Cl.$^3$ ..................... B01J 13/00; C09C 1/36; C09C 3/08
[52] U.S. Cl. .................... 252/314; 106/300; 106/308 N; 252/310; 252/313.1; 427/170
[58] Field of Search ................ 252/310, 313 R, 314; 106/300, 308 N; 427/170

[56] References Cited

U.S. PATENT DOCUMENTS

| | | | |
|---|---|---|---|
| 1,790,272 | 1/1931 | Leasman | 252/313 R |
| 1,797,760 | 3/1931 | deRohden | 252/313 R |
| 2,012,232 | 8/1935 | Kline et al. | 252/313 R X |
| 2,846,331 | 8/1958 | Rahl | 252/313 R X |
| 2,846,332 | 8/1958 | Nesty | 252/313 R X |
| 4,036,652 | 7/1977 | Rothmayer | 106/300 X |

OTHER PUBLICATIONS

Klare's "Synthetische Fasern aus Polyamiden" Akademieverlag Berlin (1963), p. 170.

Primary Examiner—Richard D. Lovering
Attorney, Agent, or Firm—Keil & Weinkauf

[57] ABSTRACT

Aqueous suspensions of finely divided titanium dioxide are produced in the presence of dispersants by a process in which titanium dioxide powder and caprolactam are kneaded together in the dry state at from 15° to 40° C., the resulting mixture is kneaded with the addition of water, the paste thus obtained is suspended in water, the suspension is then allowed to sediment, and the resulting suspension containing finely divided titanium dioxide is decanted.

3 Claims, No Drawings

PRODUCTION OF AQUEOUS SUSPENSIONS OF FINELY DIVIDED TITANIUM DIOXIDE

Polycaprolactam delustered with titanium dioxide is used for the production of delustered filaments. For this purpose, finely divided titanium dioxide is introduced into the polymerizing melt during the production of polycaprolactam. However, as described in "Klare synthetische Fasern aus Polyamiden", Akademie-Verlag, Berlin, 1963, page 170, considerable difficulties arise owing to flocculation of the titanium dioxide, and attempts have been made to eliminate these by adding dispersants. With the development of high speed spinning tehnology, ever greater demands are being made with respect to the dispersion of the titanium dioxide and its fineness. Procedures to date have not been successful in removing secondary agglomerates completely from titanium dioxide; they cannot be removed, for example, by filtration or sedimentation. As a result, irregularities and breaks occur in the delustered polyamide filaments during spinning.

It is an object of the present invention to provide aqueous suspensions of finely divided titanium dioxide which are readily dispersed in polymer melts and do not contain secondary agglomerates which lead to filament breaks.

We have found that this object is achieved by a process for the production of aqueous suspensions of finely divided titanium dioxide in the presence of dispersants, wherein titanium dioxide powder and caprolactam are kneaded together in the dry state at from 15° to 40° C, the resulting mixture is kneaded with the addition of water, the paste thus obtained is suspended in water, the suspension is then allowed to sediment, and the resulting suspension containing finely divided titanium dioxide is decanted.

The novel process has the advantage that secondary agglomerates of titanium dioxide which lead to filament breaks are substantially excluded. An additional advantage of the novel process is that finely divided titanium dioxide is obtained in a simple manner and can readily be dispersed in a high concentration in the polycaprolactam melt.

In accordance with the invention, titanium dioxide powder in the form of rutile or anatase, preferably the latter, is used as a starting material and advantageously has a particle size of less than 10 $\mu$m, in particular from 0.1 to 5$\mu$m. The titanium dioxide powder and caprolactam are kneaded together in the dry state at from 15° to 40° C., advantageously at from 20° to 30° C. As a rule from 0.15 to 0.35, in particular from 0.2 to 0.3, part by weight of caprolactam is used per part by weight of titanium dioxide. The kneading is effected in a conventional kneading apparatus, e.g. a twin-blade kneader, for example for from 1 to 3 hours. Furthermore, it has proved advantageous to add from 0.1 to 0.3% by weight, based on titanium dioxide, of an alkali metal phosphate, e.g. disodium phosphate, as a stabilizer.

The resulting mixture of titanium dioxide and caprolactam is kneaded, with the addition of water and advantageously at from 15° to 40° C., to give a paste. As a rule from 0.1 to 0.3 part by weight of water is added per part by weight of titanium dioxide. Kneading is effected in a conventional kneading apparatus, as described above.

The resulting paste, which essentially consists of titanium dioxide, caprolactam and water, with or without an alkali metal phosphate, is suspended in water. It is advantageous to use that amount of water which gives an aqueous suspension containing from 8 to 12% by weight of titanium dioxide, and to prepare the suspension at from 15° to 40° C. in a conventional manner by stirring and/or circulating the mixture. The aqueous suspension is then allowed to sediment, advantageously at from 15° to 40° C. As a rule the sedimentation lasts for from 12 to 48 hours, and coarse titanium dioxide particles settle on the bottom during this process. The sedimentation is advantageously carried out in a container with a conically tapering base. The aqueous suspension containing finely divided titanium dioxide is then decanted from the sediment.

An aqueous suspenson of from 8 to 12% by weight of titanium dioxide with a particle size of less than 1 $\mu$m, in particular from 0.1 to 0.9 $\mu$m, is obtained, and this suspension additionally contains from 0.8 to 4.8% by weight of caprolactam, with or without from 0.008 to 0.036% by weight of alkali metal phosphates.

The aqueous suspension of titanium dioxide obtained in accordance with the invention is useful for delustering polycaprolactam melts or for producing masterbatches of titanium dioxide in polycaprolactam.

The Example which follows illustrates the process according to the invention.

EXAMPLE 275 kg of titanium dioxide (anatase) of particle size 0.1–5 $\mu$m and 68 kg of caprolactam are worked for 2 hours at 20° C. in a kneader. Thereafter, 60 kg of demineralized water and 0.1% by weight (based on titanium dioxide) of disodium phosphate.12H$_2$O are added, and the mixture is kneaded for a further 2 hours. The resulting 68% strength by weight paste is flushed with 2,000 l of demineralized water, from the kneader via a turbomixer into a container, and is homogenized by circulating it for 1 hour. The mixture is left to stand for 48 hours for agglomerates and relatively large titanium dioxide particles to settle out, and thereafter the suspension is decanted from the titanium dioxide sediment. The resulting aqueous suspension contains about 100% by weight of titanium dioxide of particle size 0.1–0.9 $\mu$m.

We claim:

1. A process for the production of an aqueous suspension of finely divided titanium dioxide which comprises kneading together in the dry state titanium dioxide powder and caprolactam at a temperature of from 15° to 40° C.; adding water to the resulting mixture and kneading the paste that is formed; suspending the paste in water; allowing the suspension to sediment and thereafter decanting the suspension containing finely divided titanium dioxide.

2. A process as set forth in claim 4, wherein from 0.15 to 0.35 part by weight of caprolactam is present per part by weight of titanium dioxide.

3. A process as set forth in claim 4, wherein from 0.1 to 0.3% by weight, based on titanium dioxide, of an alkali metal phosphate is present.

* * * * *